US007083417B1

(12) United States Patent
Liu et al.

(10) Patent No.: US 7,083,417 B1
(45) Date of Patent: Aug. 1, 2006

(54) SYMBOLIC VOCABULARY DEVELOPMENT AND USE

(75) Inventors: Hanmin Liu, San Francisco, CA (US); Weisheng Liu, San Francisco, CA (US); Michael Reichert, Maple Valley, WA (US)

(73) Assignee: The Wildflowers Institute, San Francisco, CA (US)

( * ) Notice: Subject to any disclaimer, the term of this patent is extended or adjusted under 35 U.S.C. 154(b) by 455 days.

(21) Appl. No.: 10/260,723

(22) Filed: Sep. 30, 2002

(51) Int. Cl.
*G09B 19/00* (2006.01)
(52) U.S. Cl. .................................................. 434/236
(58) Field of Classification Search ................ 434/107, 434/72, 79, 219, 236, 237; 705/10, 11
See application file for complete search history.

(56) References Cited

U.S. PATENT DOCUMENTS

| | | | | |
|---|---|---|---|---|
| 5,542,870 | A | * | 8/1996 | Westersund .................. 446/75 |
| 5,762,503 | A | * | 6/1998 | Hoo et al. .................... 434/237 |
| 5,979,677 | A | * | 11/1999 | Simpson et al. ............ 211/188 |
| 6,079,984 | A | * | 6/2000 | Torres et al. ................ 434/247 |
| 6,146,238 | A | * | 11/2000 | Daiber ......................... 446/478 |
| 6,254,101 | B1 | * | 7/2001 | Young ......................... 273/460 |
| 6,599,128 | B1 | * | 7/2003 | Roberts ....................... 434/128 |
| 6,626,677 | B1 | * | 9/2003 | Morse et al. ................ 434/237 |
| 6,830,455 | B1 | * | 12/2004 | Yukio et al. ................ 434/322 |
| 2002/0103774 | A1 | * | 8/2002 | Victor et al. .................. 706/11 |

OTHER PUBLICATIONS

"Corporage Games Creative Team Building Events", Oct. 13, 1999.*

* cited by examiner

*Primary Examiner*—Kurt Fernstrom
(74) *Attorney, Agent, or Firm*—Michael E. Woods

(57) ABSTRACT

A system and method is disclosed for improving intra- and inter-cultural communications by having people of one or more cultures develop and build a symbolic vocabulary of what is salient in their work and their lives. Through successive stages of formations that select and arrange building elements into models having one or more symbols of the visual vocabulary. The symbolic vocabulary is developed by a method that includes the step of creating a collective model by a plurality of participants, the collective model having a collective symbol responsive to an assignment. The model creating step further includes, in the preferred embodiment, the steps of: (a) selecting and arranging a plurality of building elements into a model having a symbol responsive to the assignment; and (b) describing the symbol, discussing symbols and developing a vocabulary. Wherein the steps are performed successively by one or more formations of units of the plurality of participants. Each unit performs the steps and each unit's model symbol using one or more symbols from any preceding formation's symbol, or modifications of them, produces transcendent symbols through successive distillation of resonant symbols from the units of formation.

33 Claims, 6 Drawing Sheets

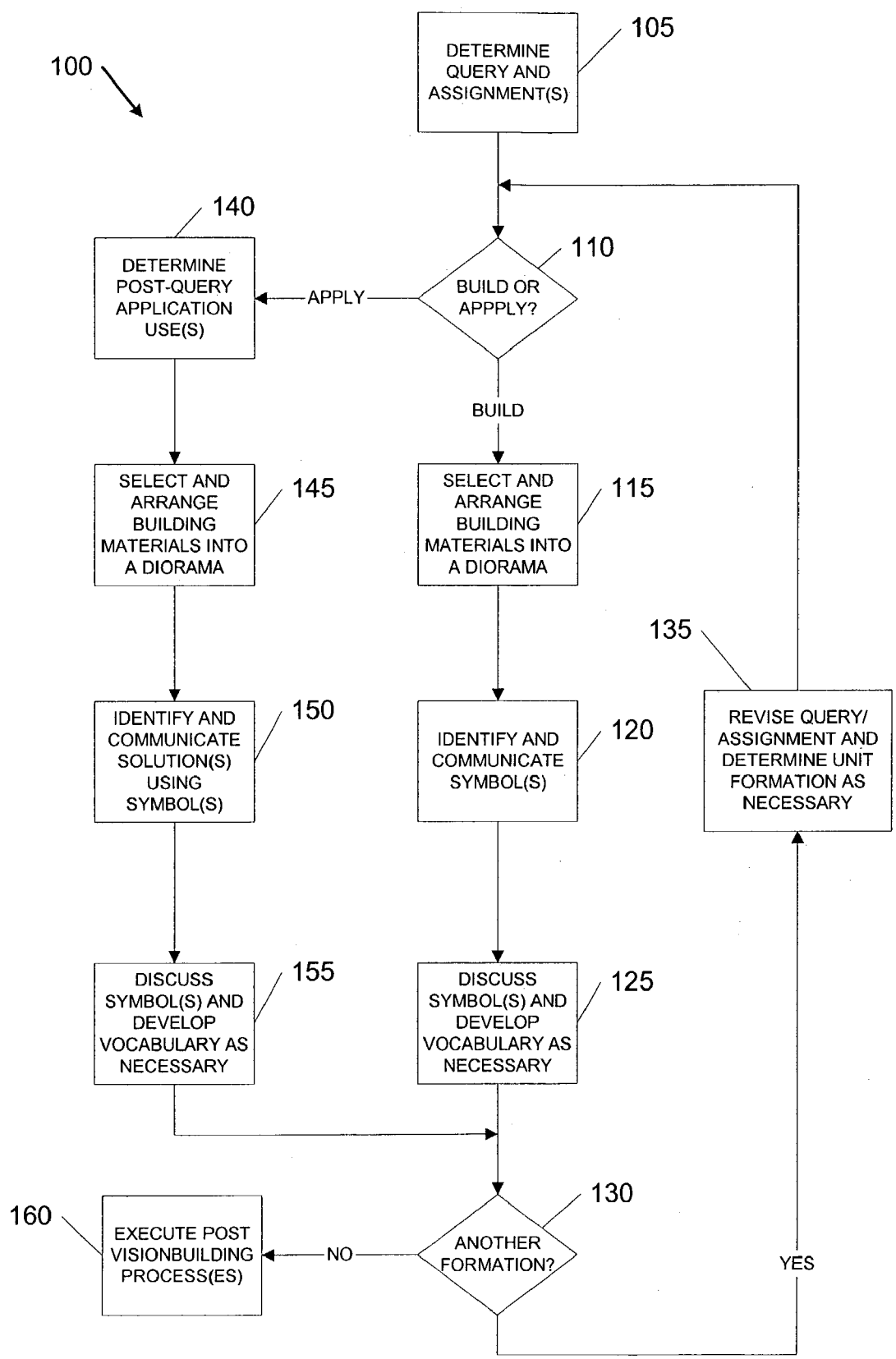
FIGURE_1

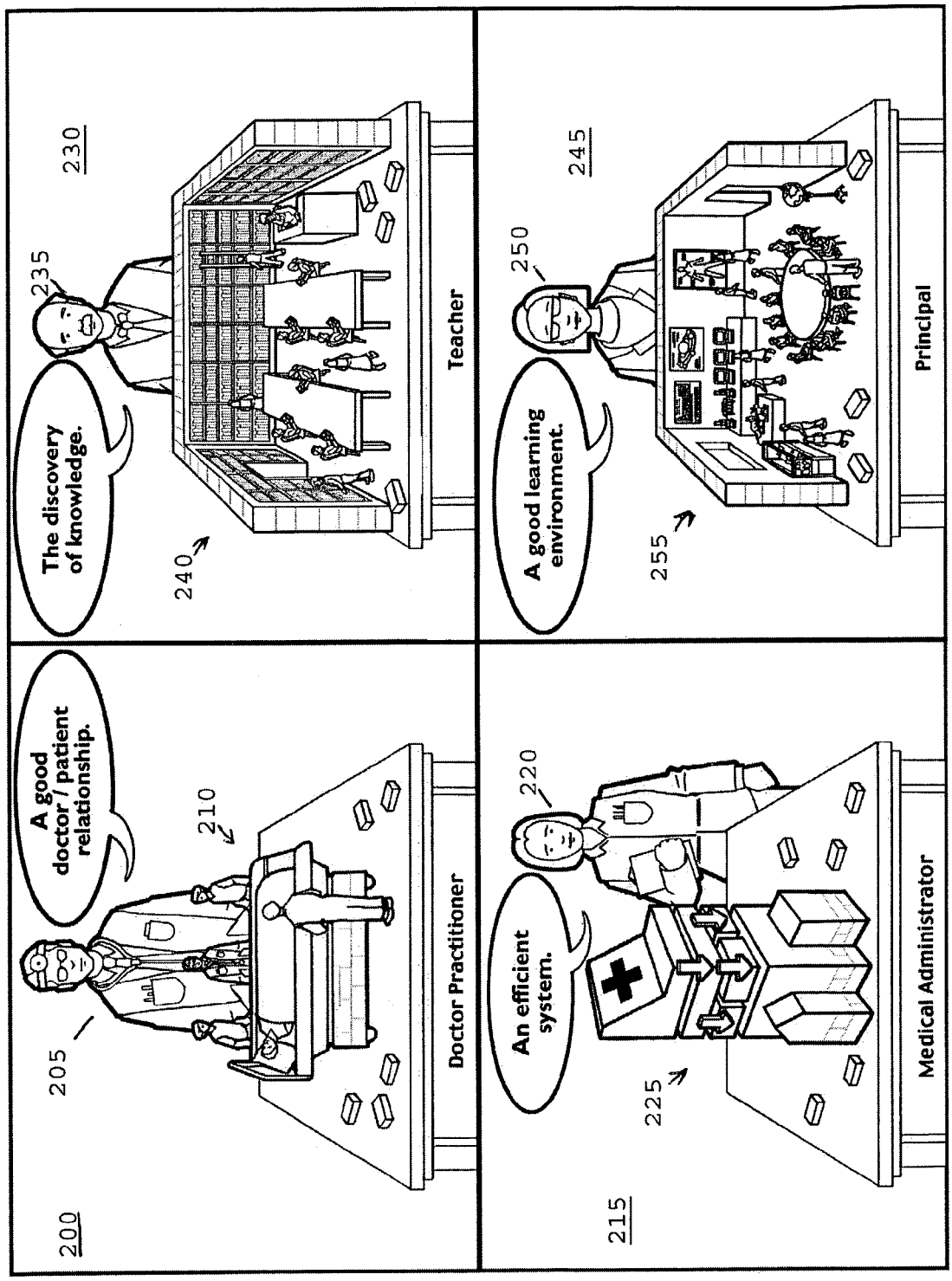
Figure_2

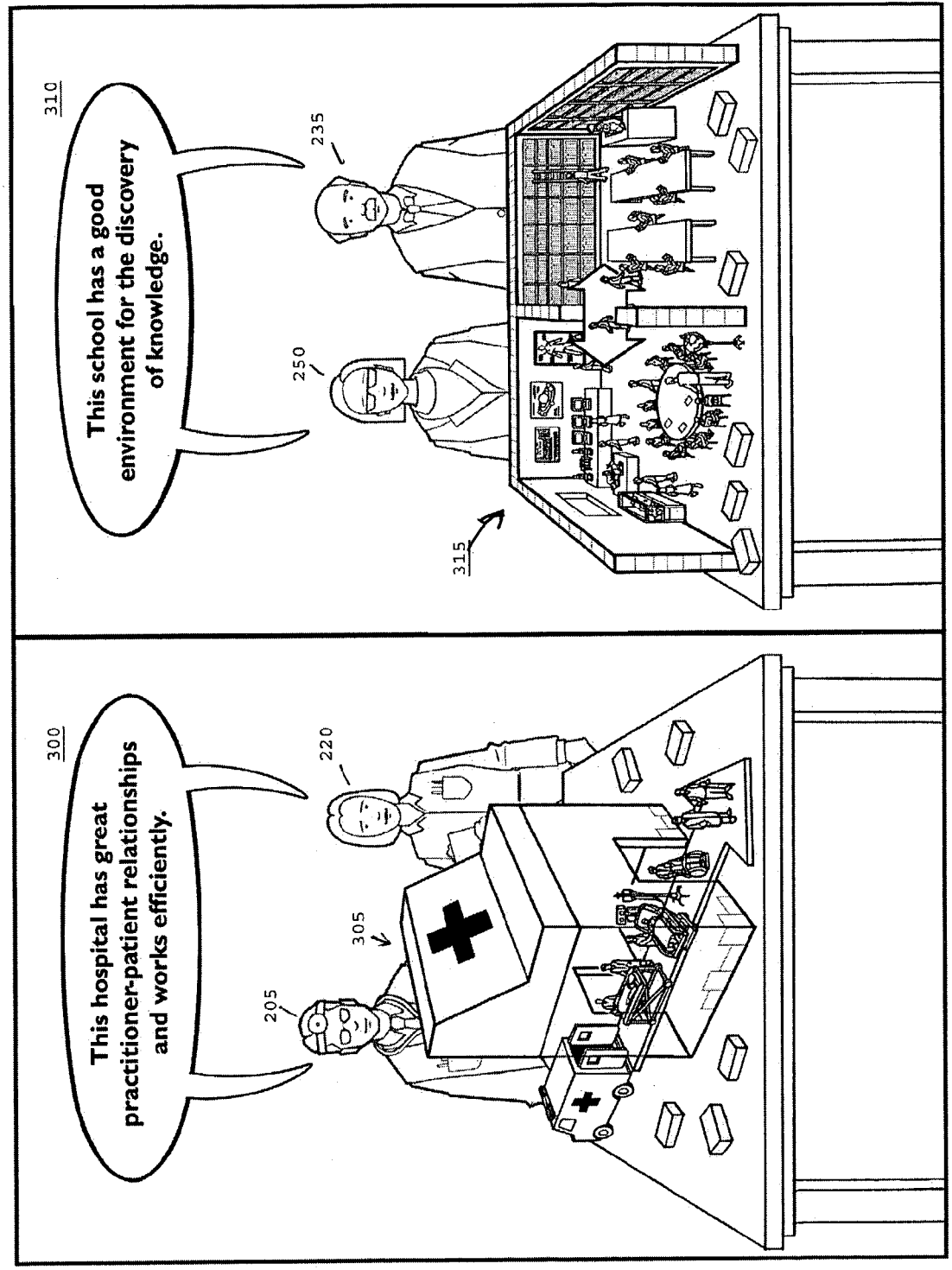
Figure_3

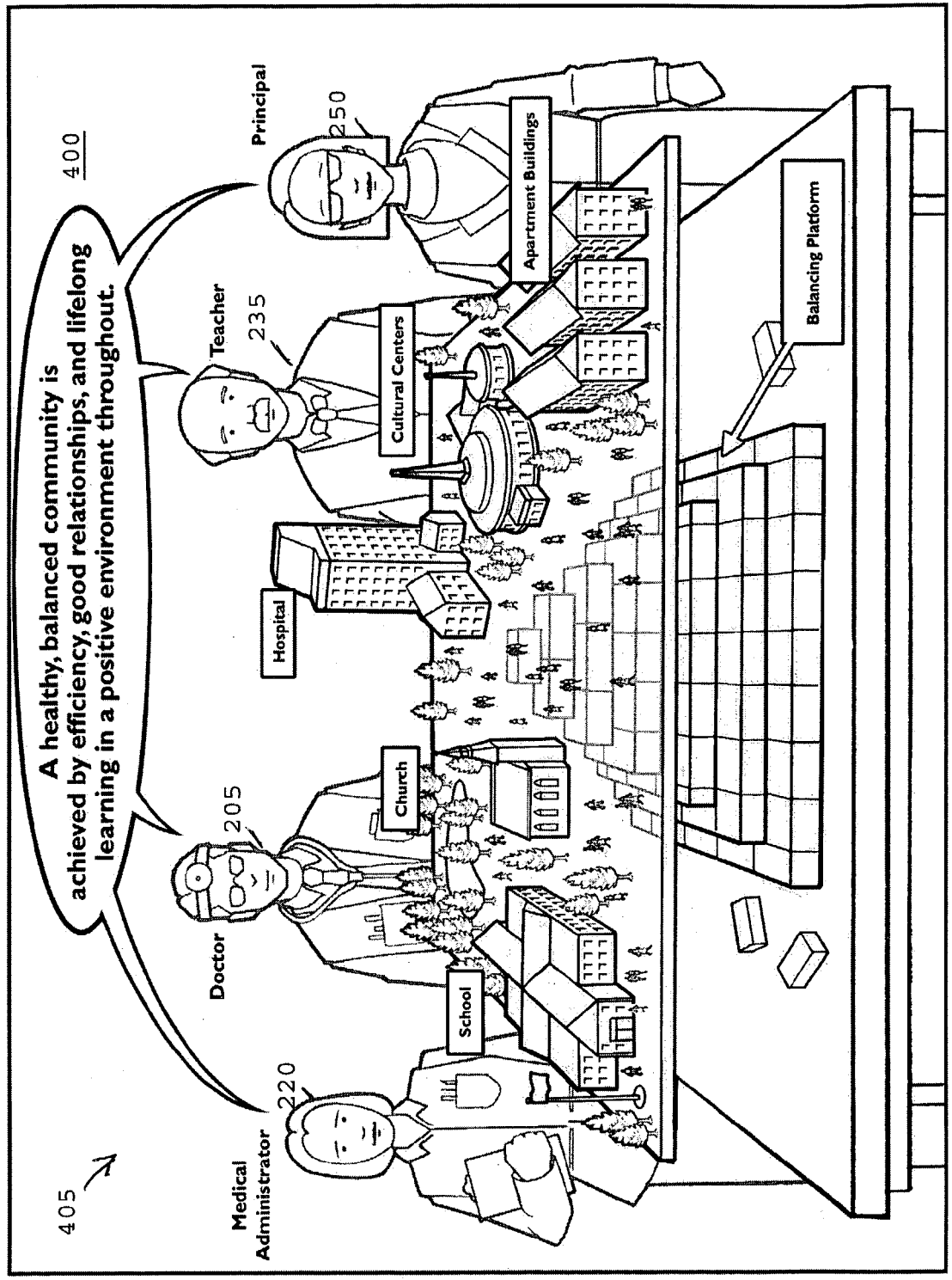

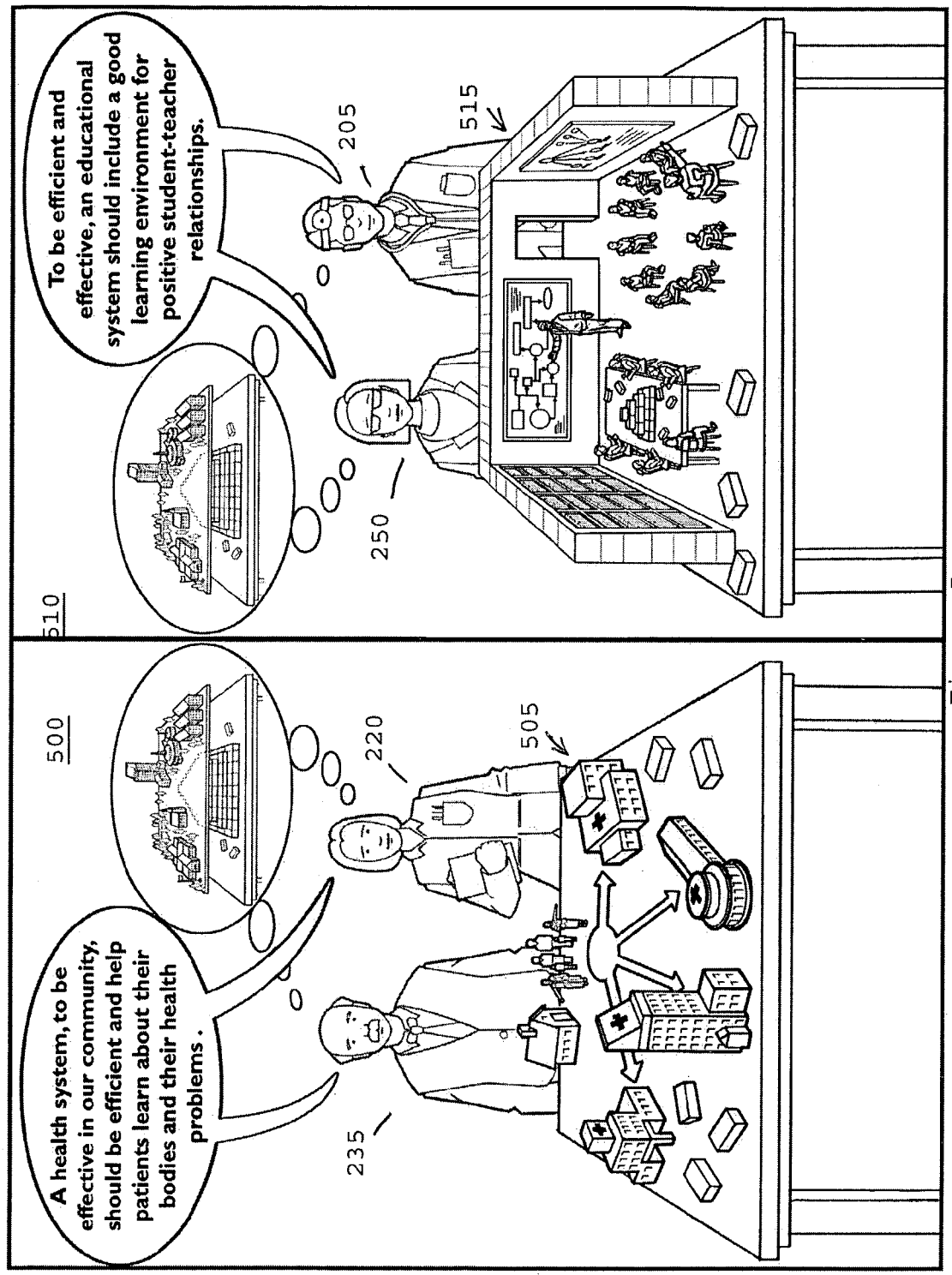
Figure_5

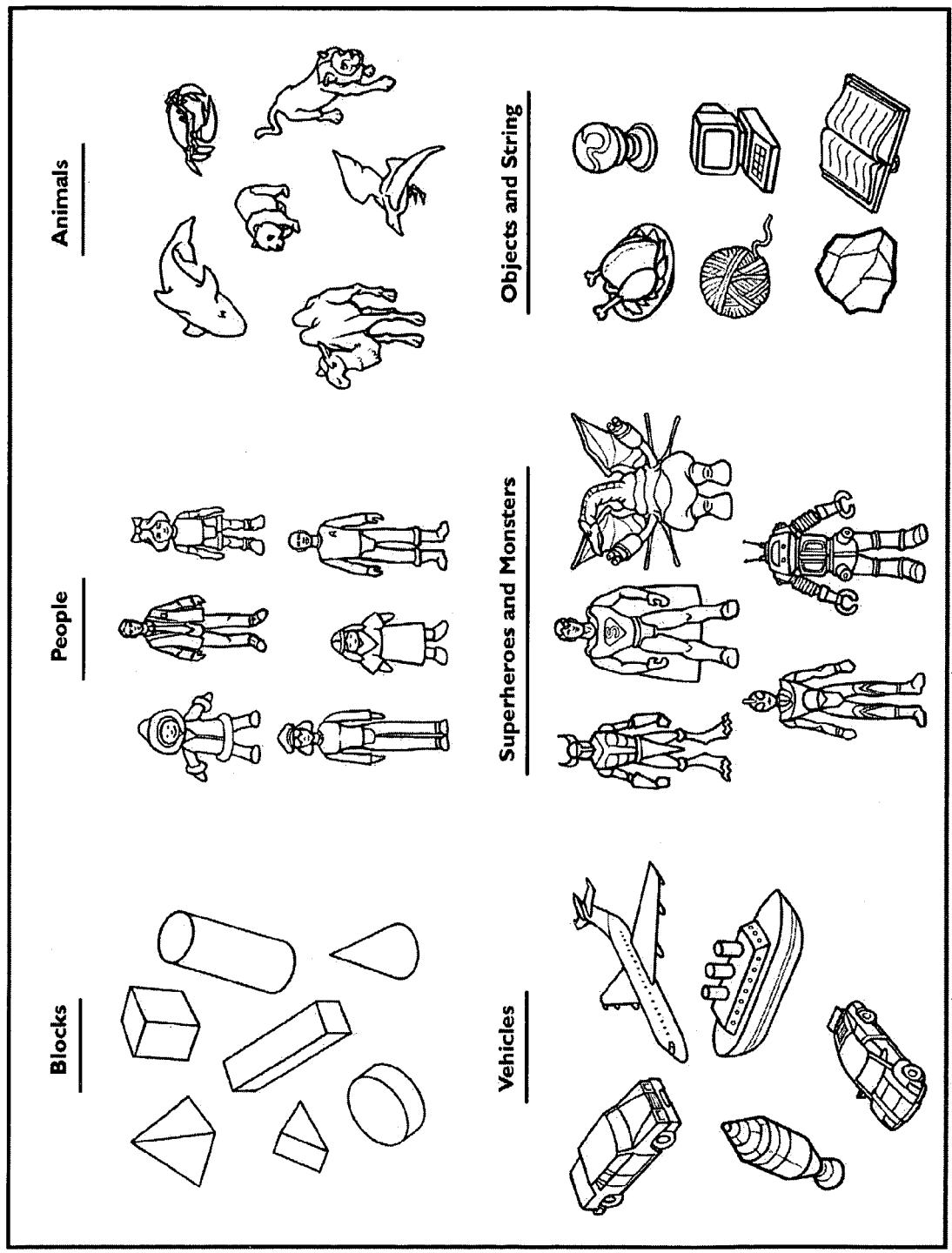

SYMBOLIC VOCABULARY DEVELOPMENT AND USE

BACKGROUND

The invention relates generally to development of a symbolic vocabulary and more specifically to development and use of symbols to enhance communication and understanding between individuals and groups within an ethnic or racial group or between diverse cultural backgrounds.

In many aspects of our everyday lives, we encounter people from different cultural or ethnic backgrounds, or those with the same background but of different generations. This is true in virtually every social, community and business setting. These settings include multinational companies or single companies having workers from diverse backgrounds, public and civic planning sessions, community meetings or gatherings to discuss and decide various issues important to the participants, and philanthropy work for addressing or improving the growth and development of groups, families and communities. For purposes of this application and for the following discussion, the term culture refers to the underlying life force of a community (composed of a specific leadership formation, cultural virtues, structure and spaces, premises, and social centers of gravity); and community means a collection of individuals grouped together by political, geographic, social, business, recreational, religious, or spiritual ties, or other shared interest(s) or motivation(s).

Individuals among whom effective communication is desired may have different backgrounds, which could interfere with efficient, accurate and effective communication. Sometimes the interference is minimal while at other times the interference prohibits real communication. A prohibition of real communication is not just an inconvenience to the individuals. Lack of real communication can create misunderstandings and an impasse among individuals. Without communication, the person may not see the strengths and assets of other persons or other cultures and communities. These strengths and assets are not assets like money or other tangible currency; many times they are far more valuable and yet invisible. These assets include human capital, social capital and the positive and beneficial practices and behaviors of a community. Both sides lose more than just the lack of a conversation might suggest.

The problems with communication among diverse cultural and ethnic groups are well known, yet there have not been any effective solutions to date. Prior art solutions include use of mediators, development and use of a common language among the group members (e.g., Esperanto), use of an experienced translator, and use of empathy to "get into the other's shoes." All of these rely on verbal and oral skills of the participants as well as of the 'outsider.' Unfortunately, that which is unspoken is not necessarily communicated accurately, if at all.

One reason that these solutions have been ineffective is that they fail to account for the context, the meaning of words, implicit premises, and motivations (both expressed and implicit) used by all the participants of a dialogue. Often there are many assumptions and unspoken understandings that are implicated in a speaker's choice of words. Reliance solely on the spoken language results in individuals taking different points of view and generally not having a common frame of reference. This form of communication is inadequate unless both the speaker and the listener share similar operative assumptions, postulates, and motivations, or at least understand them. Anthropologists Hsiao-Tung Fei and Chih-I Chang in Earthbound China: *A Study of Rural Economy in Yunnan* (1945:81–82) made this observation:

> Human behavior is always motivated by certain purposes, and these purposes grow out of sets of assumptions which are not usually recognized by those who hold them. The basic premises of a particular culture are unconsciously accepted by the individual through his constant and exclusive participation in that culture. It is these assumptions—the essence of all the culturally conditioned purposes, motives, and principles—which determine the behavior of a people, underlie all the institutions of a community, and give them unity This, unfortunately, is the most elusive aspect of culture. Since it is taken for granted by the people, the student will not find it formulated verbally. On the contrary, it must usually be inferred from concrete behavior, a process which requires a certain insight on the part of the observer.

In any of the existing processes for communication, as soon as ideas are discussed, the focus is on understanding the word or phrase, and generally we don't have an opportunity to understand the context within which ideas germinate. But it is difficult to have a discussion where both the points that the person wants to make, the context, and the definition or the meaning of words are uncovered at the same general period of time. In a discussion, the primary function is an interchange of points of view. This interchange takes precedent over the deconstruction of words in the context of the person's culture. Intercultural specialists have tried to address this problem by structuring the interchange process and by providing more background information about the cultures of the different communities prior to the interchange. But these structures and background materials generally add yet another layer to an already complicated situation. It doesn't unleash the participants to express themselves spontaneously and fully. For many ideas and precepts, much energy and time may be devoted to understanding individual words or phrases used in the interchanges. This use of energy and time, however, interferes with communication of the message and fails to provide context and clarity to the message. Additional efforts would need to be initiated to explain and understand the context and to maintain clarity. Generally, very few people could devote the necessary energy and time to convey on one hand and to learn on the other hand the specific meanings of the words and phrases while maintaining the clarity and context and timeliness of the message to be conveyed. Sole reliance on oral/verbal skills is believed to be inadequate to truly understanding communications from someone from a different culture.

Model building has been used extensively in the prior art. Hobbyists often use models to replicate an object or event. Architects use models to make proposals concerning a design of a building or other structure. Psychologists use models as a tool for individual therapy. Strategists and tacticians may use models to represent a battle or war.

SUMMARY OF THE INVENTION

A system and method is disclosed for improving intra- and inter-cultural communications by having people of one or more cultures develop and build a symbolic vocabulary of the most salient aspects of their work and life. This is accomplished through successive stages of formations that select and arrange building elements into models having one or more symbols that become a part of the group's vocabulary. The vocabulary is developed by a method that includes the step of creating a collective model by a plurality of participants, the collective model having a collective symbol responsive to an assignment. The model creating step further includes, in the preferred embodiment, the steps of: (a) selecting and arranging a plurality of building elements into a model having a symbol responsive to the assignment; and (b) describing the symbol, discussing symbols and their relationships with one another and developing the vocabulary. Wherein the steps are performed successively by one or more formations of units of the plurality of participants. Each unit performs the steps and each unit's model symbol, in a preferred embodiment, is derived from one or more symbols from any preceding formation's symbol, or modifications of them. This process produces transcendent symbols through successive distillation of resonant symbols from the units of formation.

These models offer a high bandwidth communication system to observers outside of the group—expressing nearly simultaneously both the salient points of view and the context. In contrast, the communication systems of the prior art are low bandwidth communication systems that permit an observer to maintain mental filters while receiving information and to process any communications using preestablished evaluation systems that often dilute most of the information coming to the person. The high bandwidth communication of the model, in a sense, overwhelms the observer's capacity to filter or process the message, resulting in a more accurate and comprehensive message to the observer than has been possible in the past.

An additional advantage of a symbolic language is that it uses different centers in the brain from those used in spoken communication. Consequently, many mental filters and processing systems of the observer are not applicable to communications using the visual vocabulary. The observer is thus able to receive a broad bandwidth of information with more acuity than has been possible in the past. Moreover, the expression of spatial relationships and the meaning of ideas are believed to be right brain functions. Employing the right brain also helps to form, without arduous efforts, mutually agreeable concepts Just as these principles are true in a final model constructed by one or more groups, it is a preferred embodiment that successive formations each produce one or more "premodels" and the symbols and vocabulary in the "premodels" are communicated to the other individuals in the various units of a formation with the same speed, power and precision.

BRIEF DESCRIPTION OF THE FIGURES

FIG. 1 is a flowchart of model development and application processes according to the preferred embodiment;

FIG. 2 is a scenario illustrating models built by a first formation having four units of one participant each;

FIG. 3 is a scenario illustrating models built by a second formation having two units of two participants each;

FIG. 4 is a scenario illustrating a collective model built by a third formation having one unit of four participants;

FIG. 5 is a scenario illustrating models built by a forth formation having two units of two participants each; and FIG. 6 is a perspective view of representative building materials used in the preferred embodiment.

DETAILED DESCRIPTION

FIG. 1 is a flowchart of a model development and application VisionBuilding model process 100 according to the preferred embodiment. VisionBuilding is a process that establishes a symbolic vocabulary that represents collectively resonant ideas of the group of individuals participating in the process. It is preferred that the individuals be representative of a cultural group or groups being explored, and that they be assisted by a facilitator from outside the cultural group or groups. Of course, other aggregations of individuals may be appropriate for different applications, and the use of a facilitator in some cases may be optional, as well as the characteristic that the facilitator be an "outsider."

Process 100 begins at step 105 in which a query, an initial assignment and the initial formation are determined for a group of participants by one or more facilitators. The group of participants represents one or more cultural groups. A formation is a term used to describe how the participants are organized to consider the assignment and to respond to the assignment, per round of process 100. Each formation includes one or more units and each unit includes one or more participants. The facilitator is typically not part of a formation, but observes the activities of each formation. Additional roles, duties and responsibilities of the facilitator are described below in connection with steps of process 100.

The query is a high level question or task that the group of participants works toward solving or addressing by use of assignments. Assignments and queries may be the same, but typically they are not. For example, a query might be "What is the vision, strategies, work formations, and culture of the group/organization/community?" An assignment might be "What is the current situation?" or "What are your goals?" or "How can widgets be manufactured more efficiently?" or "How can a community center be designed to effectively draw in the community members?" The facilitator and process leaders will formulate one or more assignments that help to answer the query. Examples of other assignments include: "What is important to you in your job/community?" or "What do you want to see happen?" or "What is the most effective work formation?" or "How does your community make things happen?" or "Map the assets of your community." A query is typically not shared with the participants, but the participants help to answer the query by responding to one or more assignments. There are many examples of queries and corresponding assignments, each tailored to the specific application and preferably to the group. Other examples include: "How do you/we build a coalition?" or "What should the coalition do?" or "Who are, or should be, members of the coalition?" or "Describe your community and/or organization." or "How do things get done?" or "What relationships are critical for success?" or "What are the terms for the relationship?" or "What is your community/organization identity?" or "What are your core virtues?"

After the query, the initial assignment and the initial formation are determined at step 105, process 100 will make a branch dependent upon whether the activities of the formation will be an idea/symbol generation activity or an application activity. Process 100 advances to step 115 for a building activity. At step 115, the units of the formation each select and arrange building materials into a diorama. Building materials in the preferred embodiment are suitably scaled three-dimensional building elements that include structural elements (blocks that can represent buildings or furniture, for example) and living elements (figurines that represent people, animals, or fantastical/mythical entities, for example). Other applications may employ a different set of building materials, and in some cases, such as when process 100 is implemented over a computer network, the building materials are virtual elements that are selected and arranged by participants connected into virtual dioramas.

Each unit selects and arranges these building materials into a diorama that is responsive to the assignment presented in the current round of process 100. A diorama is preferably a three-dimensional scene or stage in which the living elements are put into context with each other and with the structural element. The diorama includes one or more symbols that may be used consciously or unconsciously by the unit as the building materials are selected and arranged. These symbols are, in a broad sense, anything that a unit attaches importance and/or meaning to and/or believes is responsive to the assignment. The symbol or symbols used in a model may be new symbols, or chosen from an existing visual vocabulary or modified from previously communicated symbols as further described below in connection with step 125.

Table I is a representative set of symbols that were generated by a group of Chinese participants using process 100. These symbols are not exhaustive, and the meaning of a symbol can vary across different cultures and communities, and in some cases even temporally across the same group of participants dependent upon many factors, including the nature of the query and the assignment and the representatives of a culture. In many cases however, symbols used in, and generated from this process are able to transcend the individuals and the query and the symbols are valid for the represented culture. Process 100 lends itself to producing transcendent symbols through successive distillation of resonant symbols from the units of the formations.

TABLE I

| Organization | |
|---|---|
| Symmetry | order: a traditional Chinese premise |
| Chaotic | lack of order |
| Open space | lack of engagement |
| Tight organization | closed system |
| Unconnected buildings | distribution of labor; self-sufficient |
| Moving blocks around | demonstrating change |
| Colors | |
| Red | strong, healthy; core values; diligent |
| Yellow | weaker force; change; gentle |
| Green | stronger force; nature |
| Different colors together | unity of forces; diversity; complexity; different ways to solve problems |
| Blocks | |
| Tall blocks | hi-rise buildings; most important part; higher level of skills; distance from people; financial center |
| Low blocks | core community; grassroots level; training |
| Walls | to enclose city/community |
| Permeable walls | denotes overlap, openness (as between core and interface, or opening up of education system, etc.) |
| Bridges | connections |
| Two tall pillars | city gates; way to pass in and out of community; may be guarded or unguarded; also, the middle way (the Golden Mean) |
| House w/door | access |
| Different height blocks | differing education/rank ability |
| Paths | lines of communication open |
| Traditional architecture | long tradition, history |
| Red arrow on high block | hi-tech |
| Arch | obstacle |
| Arrows (flat) | communication |
| Different colors | different meanings; different races; different types of people; complexity |
| Stairs | different levels of needs |
| Gold triangle on red base | change based on tradition |
| Complex tower | healthy community; goals realized |

TABLE I-continued

| McDonald's | Western influence |
|---|---|
| Tai ji symbol | balanced and continual communication between core and interface |
| Circle in square | harmony, collectiveness |
| Figurines | |
| Group formation | people, communication, community |
| Variety | diversity |
| Animals | nature |
| Monster (terminator) | meeting a challenge strongly and positively |
| Baby | current need |
| Open mouth | taking in new information |
| Genie | mastery |
| Powerful figure | new ideas |
| Person facing away | disconnected to community |
| People in circle | loving caring community |
| Tall figures | more important |
| Person carrying person | relatives |
| People on hi-rise | isolation |
| Small figure | child; the model-builder (less powerful); less powerful people in general |
| Person palms out (stop) | resistance |
| Airplanes | travel abroad; communication with world |
| Person palms up | helping the community |

After the building materials are selected and arranged in step 115, process 100 advances to step 120 in which the symbols of each unit's diorama are identified and described/communicated to the other units of the formation, as well as to the facilitator and any other third party observers. The unit (through a representative or collectively) identifies the symbols by describing the diorama, including a description of what the elements represent, the meaning of the arrangement of the blocks and figurines, as well as the relationships among the elements. The facilitator and the other units may participate to clarify the descriptions or to elicit additional description from the unit as to the selection or arrangement of particular elements.

Process 100 continues to step 125 in which the formation discusses the symbols and works to develop a visual vocabulary that includes some or all of the symbols from the individual units, both from the current formation as well as any preceding formation(s). The discussion will at times take place during step 120, but the development of the visual vocabulary preferably occurs after the various symbols from the units have been described. The formation, with the assistance of the facilitator, discusses the symbols that emerge from the assignment. The formation will evaluate the symbols for pertinence to the assignment and the degree to which the participants believe that the symbol has relevance to the assignment.

The pertinence may be quantified (such as by agreeing on a numerical or qualitative weighting of the symbol) or it may be left to the individual participants to determine some personal figure of merit for the various symbols. When enough of the participants of the formation agree that a symbol is pertinent to the assignment, the symbol is resonant with the formation. Resonant symbols are included in the visual vocabulary. At each step 125, the formation and the facilitator may discuss any of the existing symbols in the visual vocabulary, with some of the symbols becoming more pertinent or less pertinent. Some symbols may even have new meanings or refinements associated with them, such that the new meanings are reevaluated for pertinence. When a unit of a formation selects and arranges building materials as described above in connection with step 115, the participant's decision to include or exclude the various symbols of the visual vocabulary reflect the resonance of the various symbols, with particularly resonant symbols being present in the dioramas of the subsequent formations of many units. Less resonant symbols typically are not used as much as more resonant symbols and are less frequently incorporated into models.

After step 125, process 130 evaluates whether another formation is to be organized and given an assignment. The determination is based in part upon the degree to which the facilitator believes that (1) the symbolic vocabulary is developed enough to answer the query; and (2) the participants have had enough opportunity to contribute to the development of the symbolic vocabulary such that the visual vocabulary is accurate and contains pertinent, resonant symbols reflecting such aspects as vision, strategy, work formation, identity, and culture of the group/organization/community. In addition, the determination is based upon where in the process 100 the participants are, as well as the scope of the task set out for the participants. The more pertinent and resonant the symbols are, the better the symbolic vocabulary will be in answering the query. Process 100 advances to step 135 when another formation is to be organized.

Step 135 revises the query/assignment as necessary, and determines any new organization of the participants into the units of the next formation. Typically the number and organization of the units changes with each formation, but that is not strictly necessary. Some applications may have the same units repeat the building subprocess of steps 115 through 125 using a possibly revised visual vocabulary.

Step 135 also provides an opportunity for the facilitator(s) to consider the dioramas, the symbols, and the visual vocabulary and to evaluate whether the assignment is achieving the proper development of the symbolic vocabulary and addressing the query. The assignment may change (and often does) for each new formation (or it may not). The query will rarely change. However, it is possible that in light of the symbols of the visual vocabulary or for other reasons, a change to the query (and likely reformulation of the assignment(s)) is warranted. Changes are more likely, however, if the process is changing from a build to an application or vice versa.

After the new formation is organized and the query/assignments made, process 100 returns to step 10 to determine again whether the new formation is a build or apply formation. Assuming that the new formation is another build formation, the process 100 repeats steps 115 through 125 to develop/refine the visual vocabulary until process 130 has an application formation or the process is to end. At step 130, when an application formation is to be organized, process 100 advances to step 135 to have a query/assignment/formation organized appropriate for an application formation. At step 110, process 100 advances to step 140 for application formations.

Step 140 determines the application question to be asked that can be answered using the visual vocabulary. Once the question (the post-query application use) is formulated and an assignment is made, process 100 advances to step 145 from step 140. For example, an application assignment might be: "Develop a new product line and show how it aligns with existing structures/work formations/culture of the organization." or "Develop a new product that breaks all the rules." or "Show how it fits into the organization." Another assignment as related to communities: "Develop a new youth program that builds on the assets of the community."

At step 145, the units of the formation again select and arrange building materials into a diorama. This time, the units make use of the visual vocabulary in responding to the assignment. In the preferred embodiment, each unit of an application formation typically has a different assignment, but it is possible that in some embodiments it may be desirable to have additional units of a formation respond to the same query/assignment.

After step 145, process 100 advances to step 150 in which each unit of the formation again identifies and describes/communicates the solutions/recommendations using resonant symbols from the visual vocabulary. At step 155, the formation may optionally discuss the symbols and once again the visual vocabulary may be revised or developed based upon additional insights from the application subprocess of steps 140 through 155.

After step 155, another determination is made as to whether a new formation is to be organized where there is agreement about application. Typically, no other formations will be organized, so process 100 advances to step 160 for post-VisionBuilding processes. These processes may include virtually anything outside of the development/application of the visual vocabulary. For example, the solutions/recommendations may be implemented, the visual vocabulary may be shared with other culture members, new programs may be developed or old programs refined, policies or scholarly papers may be produced, and a discussion may be held to reflect on lessons learned.

After process 100 has completed the application subprocess steps 140 through 155, it may recycle through additional build and/or application subprocesses until the visual vocabulary is suitably developed and able to respond appropriately to any application query.

In the preferred embodiment, process 100 starts by having the participants run through a number of building subprocesses 115. The formations start with having single participant units, and each successive cycle has fewer numbers of units as the participants are grouped together, and the groups are clustered together. The last build cycle is preferably conducted by a formation in which there is a single unit of all the participants. Sometimes process 100 stops there. Other times one or more application subprocesses are operated in which a formation having several units is organized. Each unit is typically tasked with a specific problem and asked to solve the problem using the visual vocabulary. While the above is the preferred embodiment, however, other formation organizations and assignments are possible. From one cycle to the next of process 100, there may exist more or fewer units in a formation, and there may be building and/or application subprocesses interspersed with each other.

FIG. 2 through FIG. 5 are illustrations of various models built using process 100 described in FIG. 1. The overall query was to develop a model showing a vision of health and education in the community. The assignments for FIG. 2 through FIG. 5 were, respectively: "Build a model of what is important to you in your work.", "What is important to you in your community?", "Build a shared vision of your community.", and "Build a model of service in your community." The units are organized from a community of four individuals (in this example the four individuals are on a community planning committee for example). Not shown in FIG. 2 through FIG. 5 is the facilitator that assisted the participants in setting up the formations and refining their symbol vocabulary.

FIG. 2 is a scenario illustrating four models built by a first formation having four units of one participant each. A unit 200 having a doctor practitioner 205 built a first model 210 and communicated symbols of this model to the other units/participants and facilitator. One symbol, among others, used in model 210 is that a good doctor/patient relationship is important to unit 200. A unit 215 having a medical administrator 220 built a second model 225 and communicated symbols of this model to the other units/participants and facilitator. One symbol, among others, used in model 225 is that an efficient system is important to unit 215. A unit 230 having a teacher 235 built a third model 240 and communicated symbols of this model to the other units/participants and facilitator. One symbol, among others, used in model 240 is that the discovery of knowledge is important to unit 230. A unit 245 having a principal 250 built a fourth model 255 and communicated symbols of this model to the other units/participants and facilitator. One symbol, among others, used in model 255 is that a good learning environment is important to unit 245.

FIG. 3 is a scenario illustrating two models built by a second formation having two units of two participants each. A unit 300 having doctor practitioner 205 and medical administrator 220 built a fifth model 305 and communicated symbols of this model to the other unit. Model 305 included two resonant symbols from all the symbols communicated in the first formation: namely efficiency and personal relationships. Unit 300, implicitly or explicitly, identifies these resonant symbols representing what is most important to the hospital—it should have great practitioner-patient relationships and should work efficiently. A unit 310 having teacher 235 and principal 250 built a sixth model 315 and communicated symbols from this model to unit 300 and to the facilitator. Model 315 included two resonant symbols from all the symbols communicated in the first formation: namely that the most important aspects of education are a learning environment and the discovery of knowledge. Unit 310, implicitly or explicitly, identifies these resonant symbols when describing that schools should have a good environment for the discovery of knowledge.

FIG. 4 is a scenario illustrating one collective model built by a third formation having one unit of four participants. A unit 400 having doctor practitioner 205, medical administrator 220, teacher 235, and principal 250 built a seventh model 405 and communicated symbols of this model to the facilitator and any other observers. Four symbols from the first two formations were resonant by all participants: namely learning environments, knowledge discovery, efficiency and personal relationships.

FIG. 5 is a scenario illustrating a fourth formation having two units of two participants each. A unit 500 having administrator 220 and teacher 235 built an eighth model 505 applying the resonant symbols from model 405 shown in FIG. 4. Model 505 includes all four resonant symbols in describing a health system for the community. A unit 510 having doctor 205 and principal 250 built a ninth model 515 applying the resonant symbols from model 405 shown in FIG. 4. Model 515 includes all four resonant symbols in describing an educational system for the community. By using the resonant symbols to describe the health system and the educational system, the participants focused on what is salient to their work, and the systems have an increased chance of being used and appreciated by the community members.

For purposes of the discussion of FIG. 2 through FIG. 5, the symbols and model construction were greatly simplified to ease explanation. It is not always the case that the units of the formations will all adopt all the symbols as shown here. However, the set of formations describe the general process in which resonant symbols are distilled and identified using visual elements that are grasped by the participants and incorporated into their own model. One important point is that both units in the formation of FIG. 5 use resonant symbols that were important to the community, and not just the personal symbols of the individuals. Almost any subgroup/formation organized from the group of participants should be able to answer queries/assignments in a manner similar to other collections of participants because they will use the resonant symbols from the agreed upon symbolic vocabulary that is easily understood by the group members. The facilitator and observers can also begin to communicate effectively with the group members if they use the visual vocabulary and the important symbols as well.

FIG. 6 is a perspective view of representative building materials used in the preferred embodiment. The materials have similar scale to allow them to work together and are easily selected, arranged and choreographed to allow units to represent and communicate their important symbols. In some cases the building elements are generic, and other times the building elements are customized to permit easy identification of relevant people or places.

Although the present invention has been described in accordance with the embodiments shown, one of ordinary skill in the art will readily recognize that there could be variations to the embodiments and those variations would be within the spirit and scope of the present invention. For example, the preferred embodiment has been described in terms of constructing three-dimensional models from building elements. In the preferred embodiment, these models are typically reflective and introspective from the constructing unit's frame of reference. The present invention thus identifies such a model as a virtual mirror. In a reflective mode, each unit of each formation produces a mirror that reflects the resonant symbols of the individuals of the constructing unit and hence reflects some of the cultural elements that are pertinent to the assignment and ultimately to the query. These mirrors are special virtual optical elements, because they also have the characteristic that they are virtual lenses as well. Observers outside the constructing unit are able to see the models as a virtual lens to peer into the culture and gain a perspective not otherwise available. Each unit, working with the formation, can often gauge the merits of the reflective piece. The facilitator has the added role of helping to improve the optical qualities of the lens aspect of the virtual optical elements. This is one reason that the preferred embodiment uses a facilitator from outside the cultural group: to help in the refinement of the lensing aspects of the constructed models. In the preferred embodiment, the succession of constructing/application activities as described above in process 100 creates a single virtual optical element. When the formations' assignments are reflective/introspective, this single virtual optical element is a virtual composite mirror that reflects all the group participants. These virtual optical elements have the characteristic of being "two-way" in that a reflective element for insiders becomes a transmitive element for outsiders. Thus, a particular cultural or community group that creates such an optical element produces greater cultural and community visibility for all those outside their culture or community by using the above described process. It has the attendant benefit of improving communications and cohesiveness among the insiders as well.

The present invention could be used to establish formations to have a collection of individuals build virtual lenses according to process 100. The individuals would preferably be put into units of a succession of formations to produce a single collective virtual lens (from the insider's point of view). For everyone else, this would be a virtual mirror—to see themselves through the lens of a collection of individuals. The virtual optical elements could be models constructed from building elements as described above.

The models are preferably described as tangible three-dimensional constructions, but in some applications it may be desirable to employ other mediums when creating the model or to use different medium types. In some cases, the model may be two-dimensional or even intangible. It is important in the preferred embodiment to have easily manipulated elements that units may use to construct and choreograph the elements to produce the constructed element (which in the preferred embodiment is the three-dimensional model), and that the optical element lends itself to easy description and perception by the other units of formations and by the facilitator/observers.

In some instances, sensory systems other than visual may be appropriate, such as constructs that use taste, sound, touch, kinetic activities, or auditory elements, or combinations thereof.

There are many ways to characterize the symbolic vocabulary that results from the disclosed system and process. From one perspective, the vocabulary (not the process) is like a jazz group wherein each participant's instruments and vocals are uniformly amplified and "move into a groove" harmonizing with one another. The resulting expression includes the resonant harmonies and characteristics that effectively address the query. In another perspective, the vocabulary (not the process) is like virtual genetic code of the culture. The resonant symbols uniquely define the assumptions and postulates that motivate behaviors of the members of the culture. These symbols represented the cultural. It is believed that the more homogenous that the participants are (in terms of shared social/cultural/organizational makeup), the more accurate will be the "genetic mapping" through use of the disclosed process and system. The more homogenous the participants, the stronger will be the resonances and the more transcendent the symbols should be. Similarly, for heterogeneous or mixed compositions, the resonant symbols may be fewer, less sharp and have lower amplitude. Use of the invention may thus be used to evaluate, at least qualitatively, the degree of homogeneity of the participants at least with respect to some characteristic, by assessing the nature of the resonant symbols or 'comparing' the resonant symbols to a normalized or expected set of resonant symbols. Deviations from the normalized resonant symbol set may be instructive, and may indicate where the participants or the represented cultural/organizational entity has additional strengths or weakness. In the case of a weakness, there may be attendant activities that the group could do to correct the weakness. Thus, the invention may be used for information development as well as diagnosis and treatment.

Accordingly, many modifications may be made by one of ordinary skill in the art without departing from the spirit and scope of the appended claims.

What is claimed is:

1. A method, the method comprising:
   a) creating a collective model by a plurality of participants, said collective model having a collective symbol responsive to an assignment, wherein said collective symbol is incorporated into said collective model upon an iterated consensus of a plurality of formations of said plurality of participants.

2. The method of claim 1 wherein said collective model creating step a) further comprises:
   b) selecting and arranging a plurality of building elements into a model having a symbol responsive to said assignment; and
   c) communicating said symbol,
   wherein said steps b) and c) are performed successively by one or more formations of units of said plurality of participants, each unit performing steps b) and c) and each unit's model symbol using one or more symbols from any preceding formation's communicated symbol.

3. The method of claim 2 wherein at least one formation includes a single group of said plurality of participants.

4. The method of claim 1 wherein said model creating step a) further comprises:
   b) selecting a plurality of three-dimensional building materials;
   c) arranging said plurality of building materials into a diorama having a symbol; and
   d) communicating said symbol,
   wherein said steps b), c) and d) are performed successively by two or more formations of units of said plurality of participants, each unit performing steps b), c) and d) and each unit's diorama symbol using one or more symbols from any preceding formation's communicated symbol, with at least one formation including a single unit of said plurality of participants and at least one formation including a plurality of units of said plurality of participants, each unit having one or more participants.

5. The method of claim 4 wherein said model creating step a) further comprises:
   d) incorporating one or more symbols from one or more dioramas of a preceding formation.

6. The method of claim 4 further comprising:
   e) discussing one or more communicated symbols among said plurality of participants to weight each discussed symbol for pertinence to said assignment; and
   f) building a symbol vocabulary of weighted, discussed symbols that a majority of said plurality of participants believe to have sufficient weight.

7. The presenting method of claim 6 wherein said symbol vocabulary is revised by each formation, and each unit of each successive formation selects one or more symbols from said symbol vocabulary to incorporate into said unit's diorama as part of said unit's diorama symbol.

8. A method, the method comprising:
   a) selecting and arranging, by each of a first group and a second group of a plurality of participants, a plurality of three-dimensional building materials into a group's diorama, each said group's diorama having a group symbol responsive to an assignment;
   b) communicating c, by each said group, said symbol of said group's diorama to an audience, said audience including said first group and said second group; and
   c) selecting and arranging, by a collective of all of said participants, a plurality of three-dimensional building materials into a collective diorama using one or more symbols of said group's dioramas, said collective diorama having a collective symbol responsive to said assignment.

9. A method, the method comprising:
   a) selecting and arranging, by each of a first group and a second group of a plurality of participants, a plurality of three-dimensional building materials into a group's diorama, each said group's diorama having a group symbol responsive to an assignment;
   b) communicating, by each said group, said symbol of said group's diorama to an audience, said audience including said first group and said second group;

c) selecting and arranging, by each of a first cluster of said participants and a second cluster of said participants, each said cluster selected from said groups of participants, a plurality of three-dimensional building materials into a cluster's diorama using one or more symbols of said group's dioramas, each said cluster's diorama having a cluster symbol responsive to said assignment;

d) communicating, by each said cluster, said symbol of said cluster's diorama to an audience, said audience including said first cluster and said second cluster; and e) selecting and arranging, by a collective of all of said participants, a plurality of three-dimensional building materials into a collective diorama using one or more symbols of said group's dioramas and said cluster's dioramas, said collective diorama having a collective symbol responsive to said assignment.

10. A method of using an interpretive multidimensional model, the method comprising:

a) reviewing a collective symbol presented in a collective diorama prepared by a first plurality of participants responsive to a query, wherein said collective symbol is incorporated into said collective diorama upon an iterated consensus of a plurality of formations of said plurality of participants; thereafter b) selecting and arranging, by a cluster of a set of a second plurality of participants, a plurality of three-dimensional building materials into a derivative cluster diorama using said collective symbol, said derivative cluster diorama having a derivative cluster symbol responsive to an assignment.

11. A method, the method comprising:

a) reviewing a third-party collective diorama having a third-party collective symbol; thereafter b) selecting and arranging, by each of a first participant, a second participant, a third participant and a fourth participant, a plurality of three-dimensional building materials into a participant's diorama using said third-party collective symbol, each said participant's diorama having a symbol responsive to an assignment;

c) communicating, by each said participant, said symbol of said participant's diorama to an audience including said all of said participants; and d) selecting and arranging, by each of a first group of said participants and a second group of said participants, a plurality of three-dimensional building materials into a group's diorama using one or more symbols of said participant's dioramas, each said group's diorama having a group symbol responsive to said assignment;

e) communicating, by each said group, said symbol of said group's diorama to said audience; and f) selecting and arranging, by a collective of all of said participants, a plurality of three-dimensional building materials into a collective diorama using one or more symbols of said participant's dioramas and said group's dioramas, said collective diorama having a collective symbol responsive to said assignment.

12. A method, the method comprising:

a) selecting and arranging, by a first and a second participant, a plurality of building materials into a diorama having a symbol responsive to an assignment: and b) communicating, by each said participant, said symbol of said participant's diorama to an audience, said audience including all of said participants; and c) selecting and arranging, by said first and second participants, a third plurality of three-dimensional building materials into a third diorama having a collective symbol responsive to said assignment, wherein said collective symbol is incorporated into said collective model upon an iterated consensus of said plurality of participants.

13. The method of claim 12 wherein said plurality building materials are selected from a set of aggregated and preselected archetypes.

14. The method of claim 12 wherein said audience in step b) includes a facilitator.

15. The method of claim 14 wherein said facilitator provides said assignment.

16. The method of claim 12 further comprising:

d) selecting and arranging, by said first participant, a fourth plurality of three-dimensional building materials into a first derivative diorama using said collective symbol, said first derivative diorama having a first derivative symbol that is consistent with said collective symbol.

17. The method of claim 16 further comprising:

e) describing by said first participant said first derivative symbol to a second audience.

18. The method of claim 16 further comprising:

e) selecting and arranging, by said second participant, a fifth plurality of three-dimensional building materials into a second derivative diorama using said collective symbol, said second derivative diorama having a second derivative symbol that is consistent with said collective symbol.

19. The method of claim 18 further comprising:

f) communicating by said second participant said second derivative symbol to a second audience.

20. A method, the method comprising:

a) selecting and arranging, by each of a first participant, a second participant, a third participant and a fourth participant, a plurality of three-dimensional building materials into a participant's diorama, each said participant's diorama having a symbol responsive to an assignment;

b) communicating, by each said participant, said symbol of said participant's diorama to an audience, said audience including all said participants; and c) selecting and arranging, by each of a first group of said participants and a second group of said participants, a plurality of three-dimensional building materials into a group's diorama using one or more symbols of said participant's dioramas, each said group's diorama having a group symbol responsive to said assignment;

d) communicating, by each said group, said symbol of said group's diorama to said audience; and e) selecting and arranging, by a collective of said participants, a plurality of three-dimensional building materials into a collective diorama using one or more symbols of said participants dioramas and said group's dioramas, said collective diorama having a collective symbol responsive to said assignment.

21. The method of claim 20 wherein said audience in step b) includes a facilitator.

22. The method of claim 20 further comprising:

f) selecting and arranging, by each of a first derivative group of said participants and a second derivative group of said participants, a plurality of three-dimensional building materials into a derivative group diorama using said collective symbol, each said group's diorama having a derivative group symbol responsive to said assignment.

23. The method of claim 22 further comprising:
g) communicating, by each said derivative group, said derivative group symbol of said derivative group's diorama.

24. The method of claim 22 wherein said first group includes said first and said second participants and said second group includes said third and said fourth participants.

25. The method of claim 24 wherein said third group includes said first and said third participants and said fourth group includes said second and said fourth participants.

26. A method, the method comprising:
a) selecting and arranging, by each of a plurality of participants, a plurality of three-dimensional building materials into a participant's diorama, each said participant's diorama having a symbol responsive to an assignment;
b) communicating, by each said participant, said symbol of said participant's diorama to an audience, said audience including said plurality of participants;
c) selecting and arranging, by each of a first group of said participants, a second group of said participants, a third group of said participants, and a fourth group of said participants, a plurality of three-dimensional building materials into a group's diorama using one or more symbols of said participant's dioramas, each said group's diorama having a group symbol responsive to said assignment;
d) communicating, by each said group, said symbol of said group's diorama to said audience;
e) selecting and arranging, by each of a first cluster of said participants and a second cluster of said participants, each said cluster selected from said groups of participants, a plurality of three-dimensional building materials into a cluster's diorama using one or more symbols of said participant's dioramas and said group's dioramas, each said cluster's diorama having a cluster symbol responsive to an assignment;
f) communicating, by each said cluster, said symbol of said cluster's diorama to said audience; and
g) selecting and arranging, by a collective of said participants, a plurality of three-dimensional building materials into a collective diorama using one or more symbols of said participant's dioramas, said group's dioramas and said cluster's dioramas, said collective diorama having a collective symbol responsive to said assignment.

27. The method of claim 26 further comprising:
g) selecting and arranging, by each of a first derivative cluster of said participants and a second derivative cluster of said participants, a plurality of three-dimensional building materials into a derivative cluster diorama using said collective symbol, each said derivative cluster's diorama having a derivative cluster symbol responsive to said assignment.

28. The method of claim 27 wherein said first cluster includes said first and said second groups and said second cluster includes said third and said fourth groups.

29. The method of claim 27 wherein said first derivative cluster includes said first and said third groups and said second derivative cluster includes said second and said fourth groups.

30. A method, the method comprising:
a) creating a collective element by a plurality of participants, said collective element having a collective symbol responsive to an assignment, wherein said collective symbol is incorporated into said collective element upon an iterated consensus of said plurality of participants.

31. The method of claim 30 wherein said element creating step a) further comprises:
b) selecting and arranging a plurality of sensory elements into a construct having a symbol responsive to said assignment; and
c) communicating said symbol,
wherein said steps b) and c) are performed successively by one or more formations of units of said plurality of participants, each unit performing steps b) and c) and each unit's model symbol using one or more symbols from any preceding formation's communicated symbol.

32. The method of claim 31 wherein said element is a model and said sensory elements are building materials.

33. A multidimensional model made by a method, the method comprising:
a) creating a collective model by a plurality of participants, said collective model having a collective symbol responsive to an assignment, wherein said collective symbol is incorporated into said collective model upon an iterated consensus of said plurality of participants.

* * * * *